US008135182B2

(12) United States Patent
Luo et al.

(10) Patent No.: US 8,135,182 B2
(45) Date of Patent: Mar. 13, 2012

(54) METHOD FOR CREATING PHOTO CUTOUTS AND COLLAGES

(75) Inventors: Jiebo Luo, Pittsford, NY (US); Kenneth A. Arnold, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 912 days.

(21) Appl. No.: 12/107,104

(22) Filed: Apr. 22, 2008

(65) Prior Publication Data

US 2009/0263038 A1    Oct. 22, 2009

(51) Int. Cl.
*G06K 9/00* (2006.01)

(52) U.S. Cl. ......... 382/118; 382/129; 382/132; 382/171

(58) Field of Classification Search .................. 382/118, 382/128, 132, 149, 171, 195, 203, 204, 205
See application file for complete search history.

(56) References Cited

U.S. PATENT DOCUMENTS

| | | | | |
|---|---|---|---|---|
| 4,972,493 A | * | 11/1990 | Chemaly | 382/149 |
| 5,544,256 A | * | 8/1996 | Brecher et al. | 382/149 |
| 5,901,240 A | * | 5/1999 | Luo et al. | 382/132 |
| 6,282,317 B1 | * | 8/2001 | Luo et al. | 382/203 |
| 6,429,875 B1 | * | 8/2002 | Pettigrew et al. | 345/591 |
| 7,623,692 B2 | * | 11/2009 | Schildkraut et al. | 382/128 |
| 2006/0062442 A1 | * | 3/2006 | Arnaud et al. | 382/128 |
| 2006/0127881 A1 | * | 6/2006 | Wong et al. | 435/4 |
| 2009/0081775 A1 | * | 3/2009 | Hodneland et al. | 435/317.1 |

OTHER PUBLICATIONS

Jiebo Luo ED—anonymous: "Subject Content-Based Intelligent Cropping of Digital Photos", Multimedia and Expo, 2007 IEEE International Conference on, IEEE, PI, Jul. 1, 2007, pp. 2218-2221, XP031124101, ISBN: 978-1-4244-1016-3, abstract, p. 2218, right-hand column, section 2.1.

Kefei Lu et al.: "Detecting Textured Objects Using Convex Hull", Machine Vision and Applications, Springer, Berlin, DE, vol. 18, No. 2, Jan. 25, 2007, pp. 123-133, XP019487841, ISSN: 1432-1769, Figure 4, Section 2.3.

Jingdong Wang et al.: "Picture Collage" Computer Vision and Pattern Recognition, 2006 IEEE Computer Society Conference on New York, NY, USA, Jun. 17-22, 2006, Piscataway, NJ, USA, IEEE, Piscataway, NJ, USA, vol. 1, Jun. 17, 2006, pp. 347-354, XP010922840, ISBN: 978-0-7695-2597-6, abstract, section 2.1.

Setlur V et al.: "Retargeting Images and Video for Preserving Information Saliency", IEEE Computer Graphics and Applications, IEEE Service Center, New York, NY, US, vol. 27, No. 5, Sep. 1, 2007, pp. 80-88, XP011191901, ISSN: 0272-1716, p. 80, right-hand column, last paragraph, p. 81, left-hand column, "Importance Map", p. 86.

Luo J et al.: "A Bayesian Network-Based Framework for Semantic Image Understanding", Pattern Recognition, Elsevier, GB, vol. 38, No. 6, Jun. 1, 2005, pp. 919-934, XP004777891, ISSN: 0031-3203, abstract, section 4.1.

Wang et al, Picture Collage, CVPR 2006, vol. 1, pp. 347-354.
Rother et al, AutoCollage, ACM Trans. on Graphics (SIGGRAPH) Aug. 2006, pp. 847-852.

* cited by examiner

*Primary Examiner* — Wesley Tucker
*Assistant Examiner* — Aklilu Woldemariam

(57) ABSTRACT

A method for automatically producing a new digital image from a first digital image that includes regions of interest, includes obtaining a main subject belief map including an array of belief values indicating the location and relative importance of subject matter in the first digital image; producing a mask for each privileged object in the first digital image, each such mask including margins around its corresponding privileged object; overlaying the mask(s) onto the belief map; and producing a first convex hull that includes the mask(s) with margin(s) and regions of the highest belief values from the belief map.

18 Claims, 17 Drawing Sheets

METHOD FOR CREATING PHOTO CUTOUTS AND COLLAGES

FIELD OF THE INVENTION

The present invention is related to image processing, and in particular to producing an image collage based on main subject detection.

BACKGROUND OF THE INVENTION

Consumers have the need for producing new images from their original digital images. A collage is a popular form of such new images.

Collage (From the French: coller, to stick) is regarded as a work of visual arts made from an assemblage of different forms or parts, thus creating a new whole. The parts are related to each other either for the same event or theme. This term was coined by both Georges Braque and Pablo Picasso in the beginning of the 20th century when collage became a distinctive part of modern art. Use of this technique made its dramatic appearance among oil paintings in the early 20th century as an art form of groundbreaking novelty.

An artistic collage work can include newspaper clippings, ribbons, bits of colored or hand-made papers, portions of other artwork, photographs, and such, glued to a piece of paper or canvas.

Techniques of collage were first used at the time of the invention of paper in China around 200 BC. The use of collage, however, remained very limited until the 10th century in Japan, when calligraphers began to apply glued paper, using texts on surfaces, when writing their poems.

Since the beginning of the 19th century, collage methods also were used among hobbyists for memorabilia (i.e. applied to photo albums) and books (i.e. Hans Christian Andersen, Carl Spitzweg). For example, a consumer can create a collage of a special event, e.g., a NBA all-star game, by combining personal photos with professional photos and/or background.

Digital collage is the technique of using computer tools in collage creation to encourage chance associations of disparate visual elements and the subsequent transformation of the visual results through the use of electronic media.

A collage made from photographs, or parts of photographs, is also called photomontage. Photomontage is the process (and result) of making a composite photograph by cutting and joining a number of other photographs. The composite picture was sometimes photographed so that the final image is converted back into a seamless photographic print. The same method is accomplished today using image-editing software. The technique is referred to by professionals as "compositing".

Creating a photomontage has, for the most part, become easier with the advent of computer software such as Adobe Photoshop. These programs make the changes digitally, allowing for faster workflow and more precise results. They also mitigate mistakes by allowing the artist to "undo" errors.

For casual users such as consumers, it is desirable to automate the process of creating a collage because they are usually not skilled at digital image editing and it is labor intensive to cut out the portions of interest from the images. A number of existing image editing software products provides automatic collages. A simple solution is simply tiling individual images into a collage; the resulted collage is usually not interesting (see "tiling" in FIG. 4). Google Picasa piles photos on top of each other with no regard to the scene content. The results are usually not satisfactory (see "piling" in FIG. 5) because the most interesting parts of images can be blocked by other images. The source of the problem is the lack of scene analysis to understand where the main subject and background are in the image.

There are other products in the market: AKVIS Chameleon, Wondershare Photo Collage Studio, fCoder Group PhotoMix, Three Dot Lab EasyCollage, VickMan Photo Collage Screensaver, iFoxSoft Photo Collage, and iPhoto. None of the tools exhibit automated main subject detection to cutout or place main subject into products. In comparison, iFoxSoft QuickSnap and ArcSoft Cut-It-Out provide main subject extraction by having the user manually mark the desired subject and background areas of the image.

To make smart collages, Wang et al. (Jindong Wang, Jian Sun, Long Quan, Xiaouou Tang and Heung-Yeung Shum. Picture Collage. CVPR 2006, Vol. 1, pp. 347-354.) use attention estimation to decide a region of interest (ROI) and then use an optimization technique known as graph cuts to perform layout so as to avoid covering the ROIs. However, Wang et al. assume that there is a single primary ROI in each image and the attention estimation always finds the ROI, neither of which is guaranteed. In addition, Wang et al. do not produce cutouts from the source images; the source images are laid out on top of each other, albeit with the ROIs visible (see "staggering" in FIG. 6).

Rother et al. (Carsten Rother, Lucas Bordeaux, Youssef Hamadi, Andrew Blake, AutoCollage, ACM Transactions on Graphics (SIGGRAPH), August 2006, Pages: 847-852.) consider sky and grass regions such that the photos with prominent sky regions appear at the top and those with prominent grass regions appear at the bottom of the collage. Also note this approach generally does not involve cut-out, or overlay; it blends all the images together (see "blending" in FIG. 7).

Neither of these techniques involves special treatment of the most privileged regions in the images. In most cases, the most privileged part of an image is the face or faces while sometimes animals, flowers or any other peculiar object can be the main subject of an image and thus needs to be preserved during the collage process. Moreover, it is often desirable to retain some margin space around such main subjects such that they are not cut out too tight. In the case of faces, we refer to such margin as "head room".

There is a need to provide an automatic, intelligent, and reliable process for identifying the main subject for cutout or optimum placement on a collage or in a template hole, so that (1) the main subject of the image is not cropped in part or in its entirety, (2) both smooth and textured background can be identified and excluded in part or in its entirety if necessary, and (3) common picture composition rules such as sufficient headroom can be enforced.

SUMMARY OF THE INVENTION

The present invention is directed to overcoming one or more of the problems set forth above. Briefly summarized, according to one aspect of the present invention, the invention resides in a method for automatically producing a new digital image from a first digital image that includes regions of interest, comprising (a) obtaining a main subject belief map including an array of belief values indicating the location and relative importance of subject matter in the first digital image; (b) producing a mask for each privileged object in the first digital image, each such mask including margins around its corresponding privileged object; (c) overlaying the mask(s) onto the belief map; and (d) producing a first convex hull that includes the mask(s) with margin(s) and regions of the highest belief values from the belief map.

The present invention provides a method for image collaging having the advantage of (1) ensuring that the main subject of the image is not cropped in part or in its entirety, (2) identifying and removing both smooth and textured background if necessary, and (3) enforcing common picture composition rules such as leaving sufficient headroom.

These and other aspects, objects, features and advantages of the present invention will be more clearly understood and appreciated from a review of the following detailed description of the preferred embodiments and appended claims, and by reference to the accompanying drawings.

DESCRIPTION OF THE PREFERRED EMBODIMENT

The present description will be directed in particular to attributes forming part of, or cooperating more directly with, the method in accordance with the present invention. Attributes not specifically shown or described herein can be selected from those known in the art. In the following description, a preferred embodiment of the present invention would ordinarily be implemented as a software program, although those skilled in the art will readily recognize that the equivalent of such software may also be constructed in hardware. Given the method as described according to the invention in the following materials, software not specifically shown, suggested or described herein that is useful for implementation of the invention is conventional and within the ordinary skill in such arts. If the invention is implemented as a computer program, the program may be stored in conventional computer readable storage medium, which can include, for example; magnetic storage media such as a magnetic disk (such as a floppy disk or a hard drive) or magnetic tape; optical storage media such as an optical disc, optical tape, or machine readable bar code; solid state electronic storage devices such as random access memory (RAM), or read only memory (ROM); or any other physical device or medium employed to store a computer program.

Figure 1:
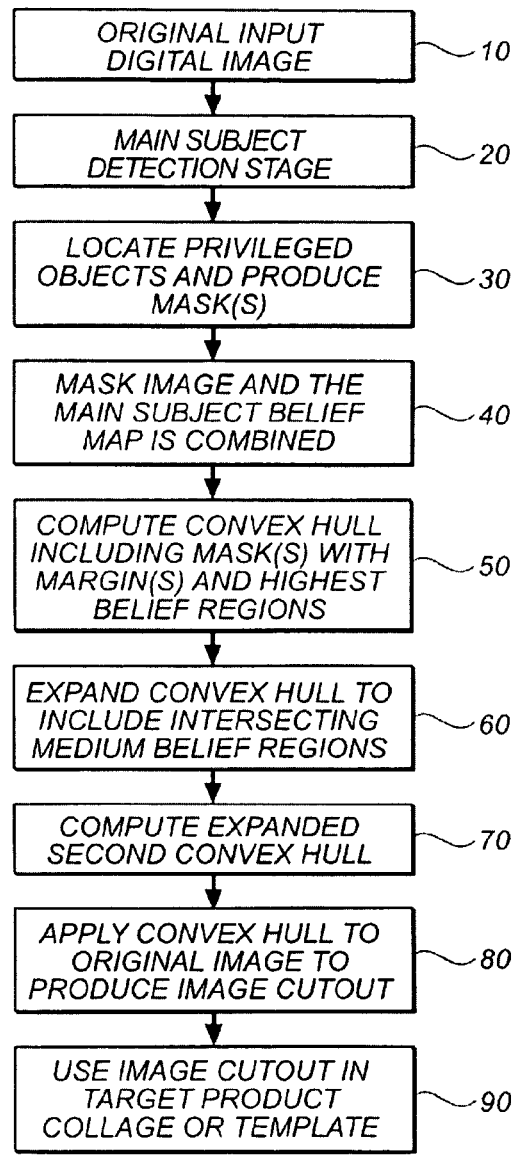
FIG. 1 is a flow chart showing an embodiment of the present invention.
Figure 8:
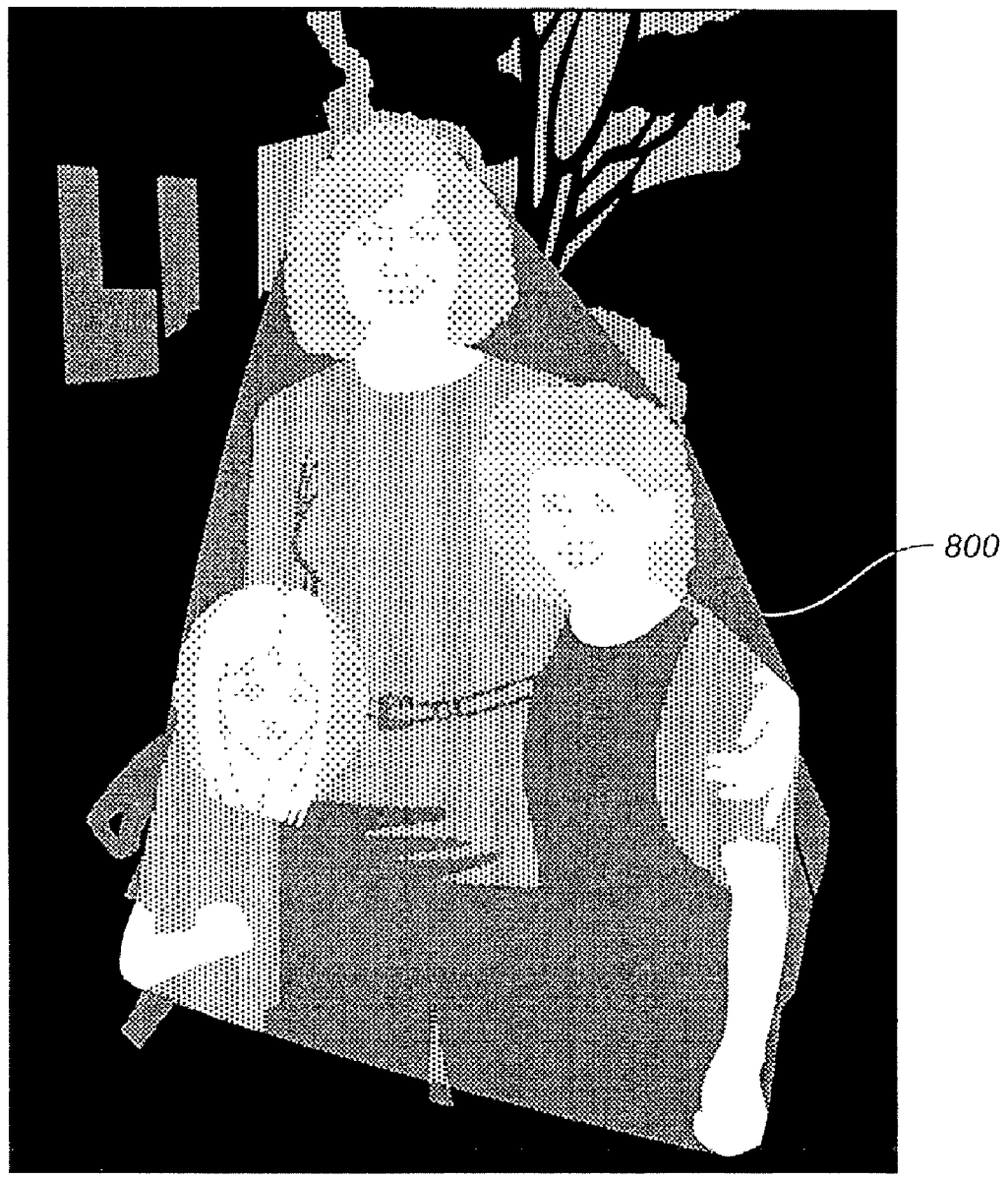
FIG. 8 is a pictorial view of a convex hull, which is used to compute the minimum polygon that encloses all main subject regions.
Figure 9:
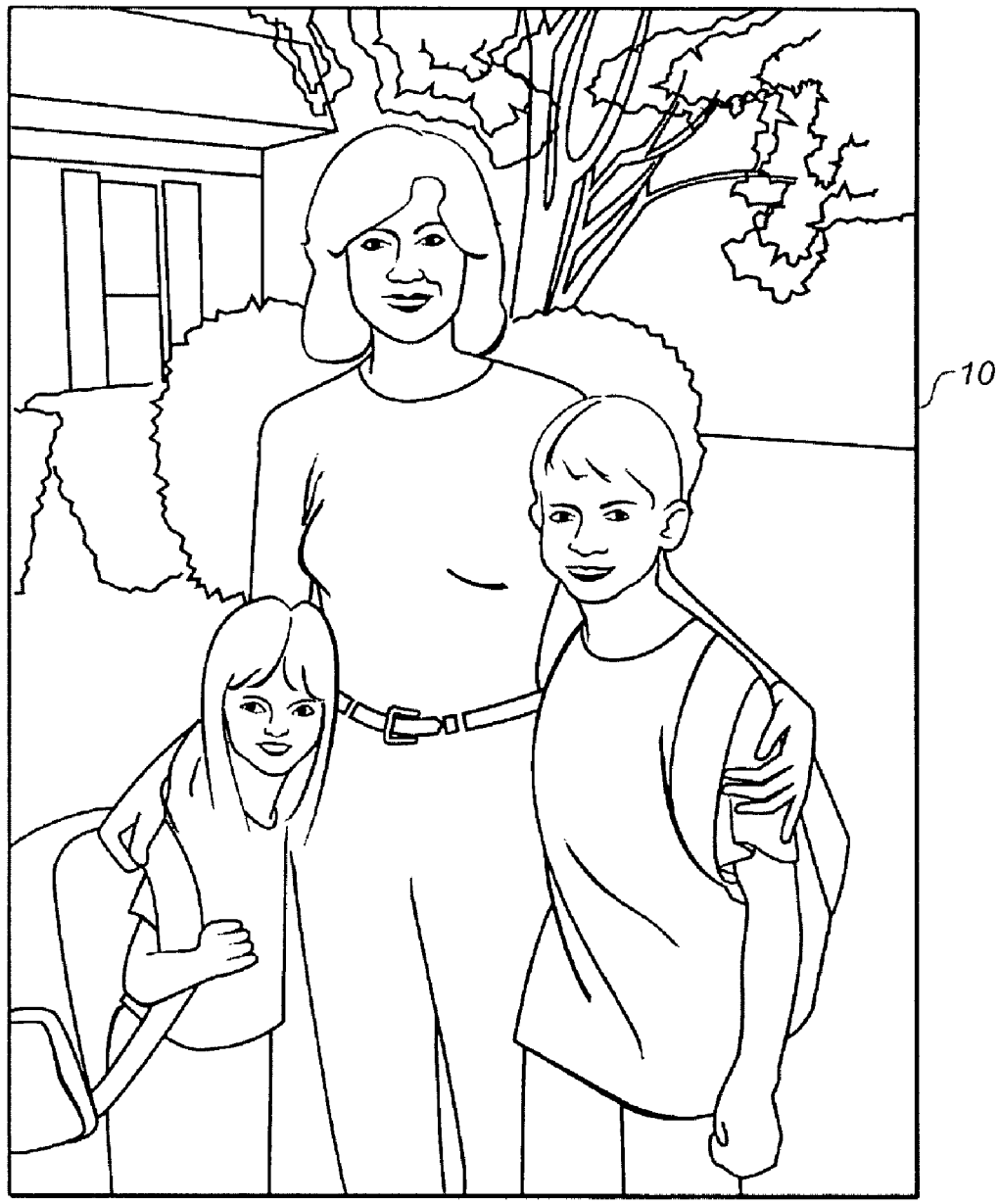
FIG. 9 is an example of an input image.
Figure 10:
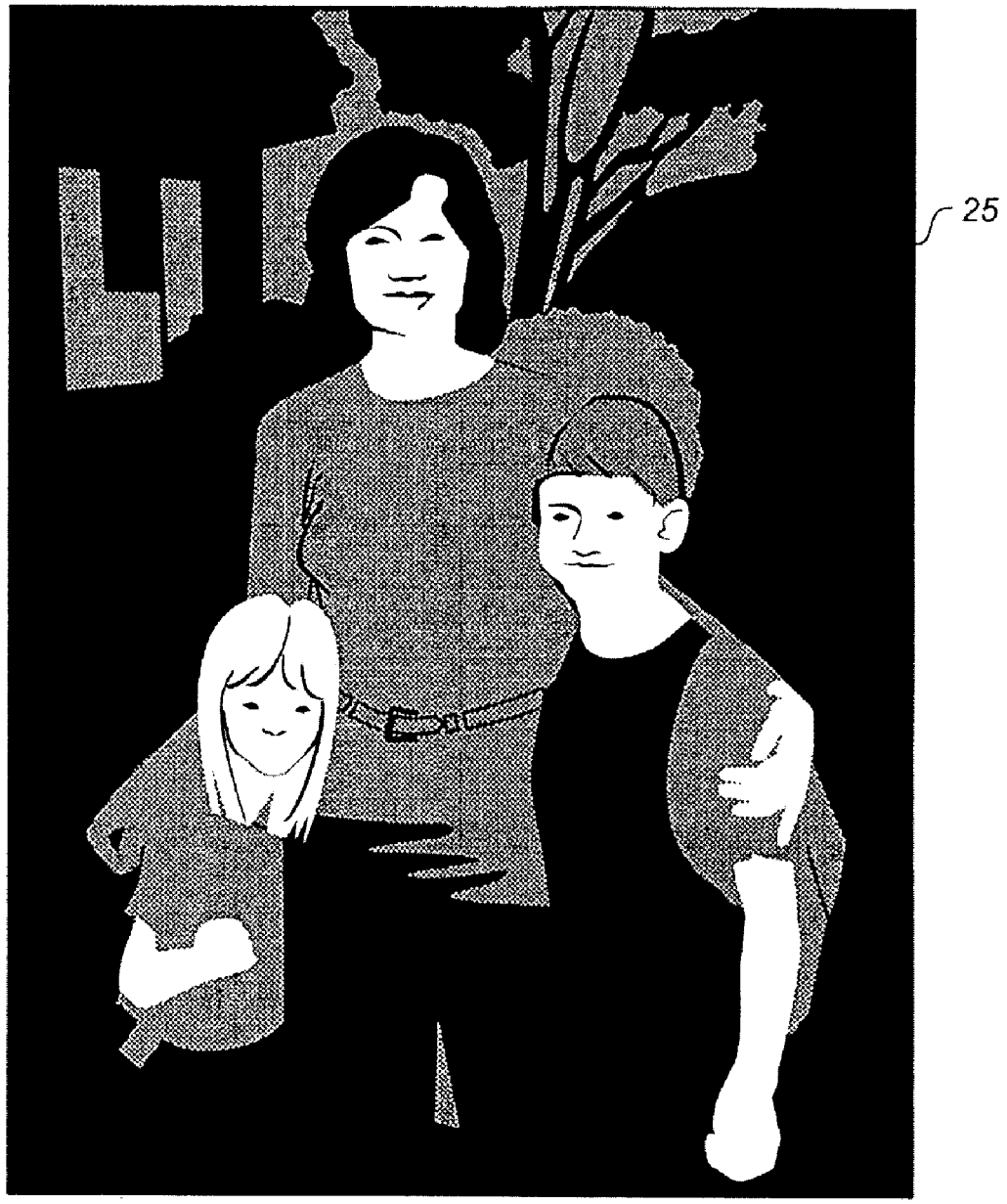
FIG. 10 is an example of a main subject belief map generated from FIG. 9.
Figure 11:
FIG. 11 is an example of masks of the privileged objects made from the image of FIG. 9 according to the present invention, showing a desired amount of headroom.
Figure 13:
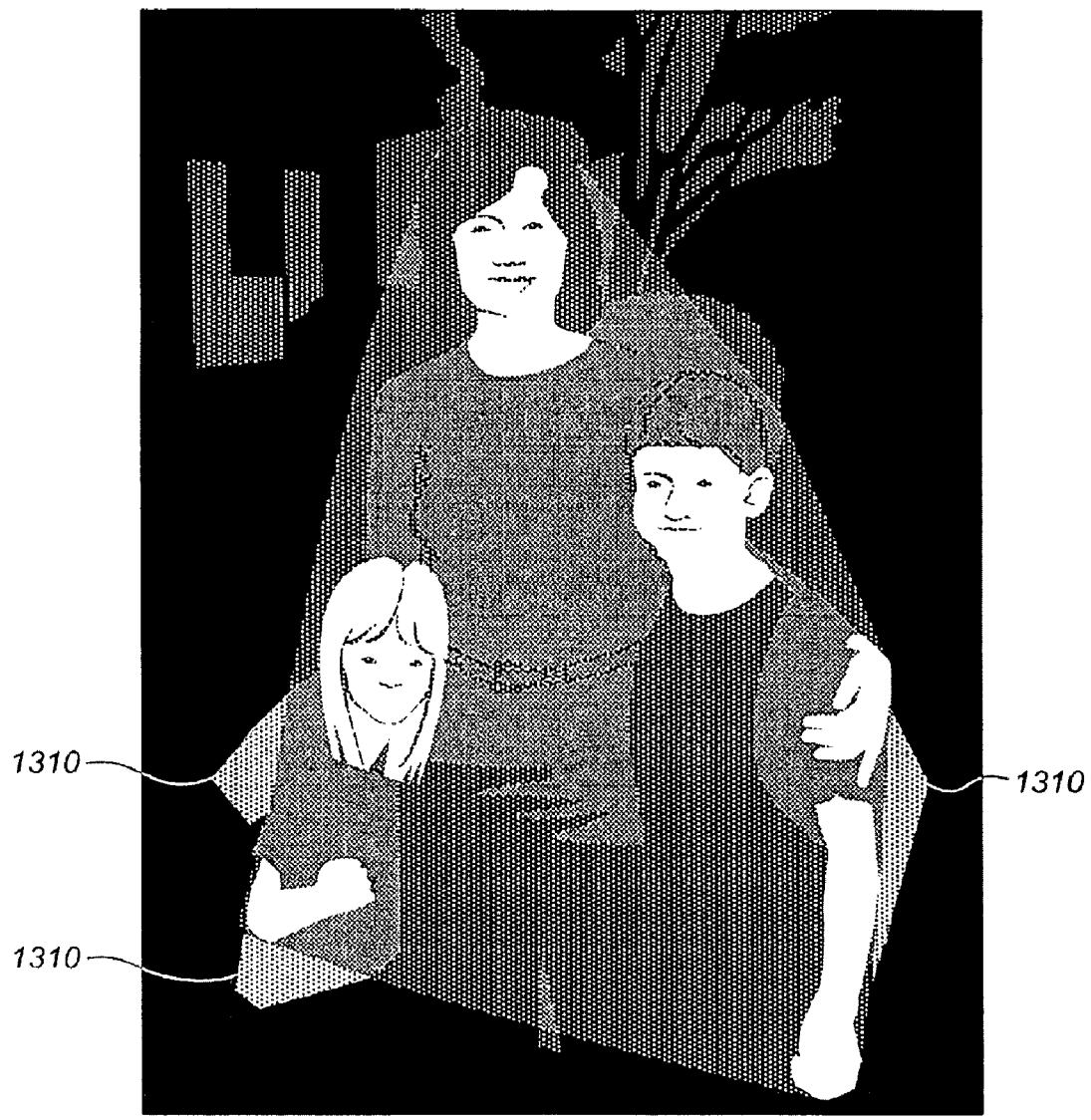
FIG. 13 is an example of the expanded polygon according to the present invention.
Figure 14:
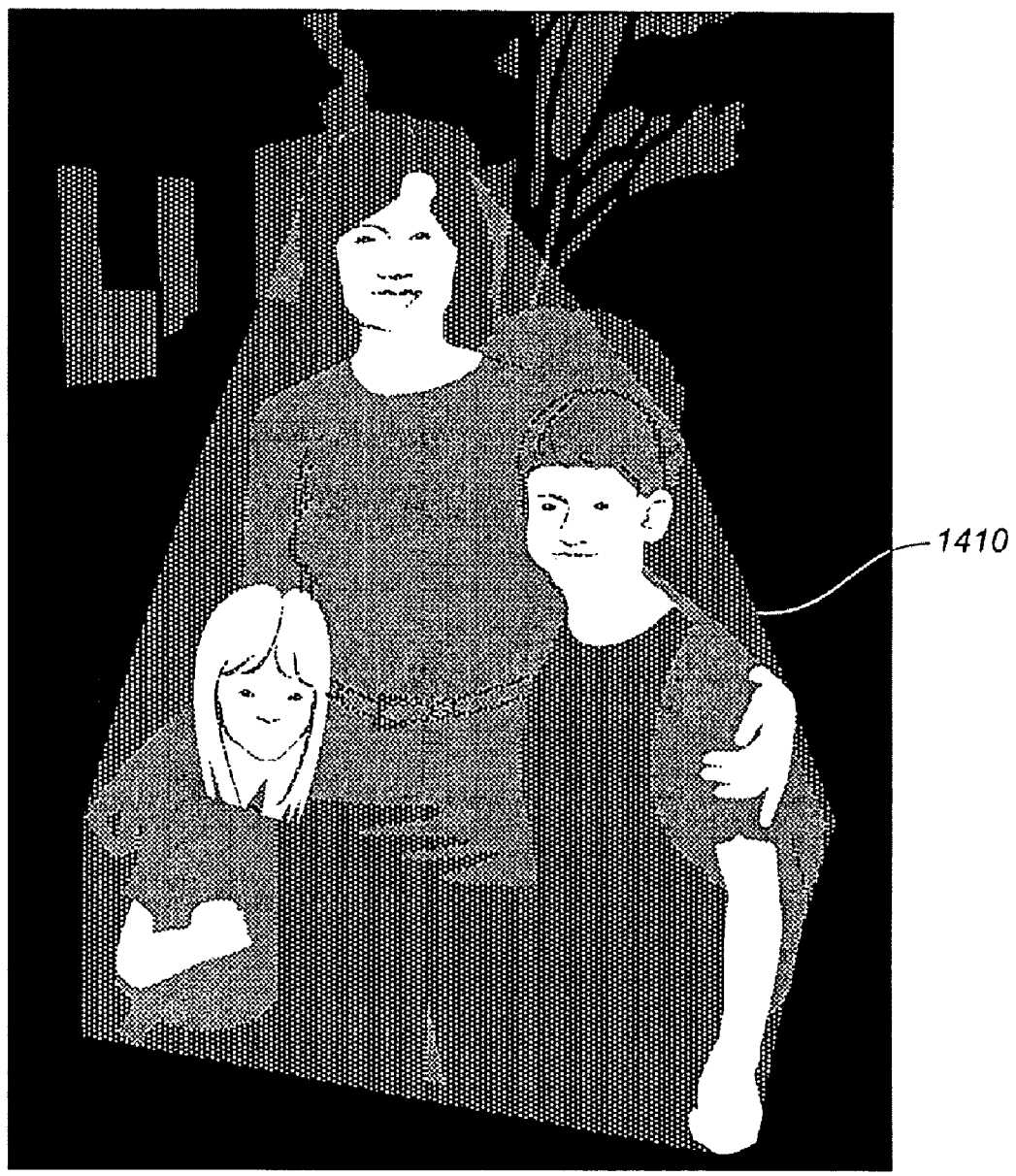
FIG. 14 is an example of the expanded second convex hull according to the present invention.
Figure 15:
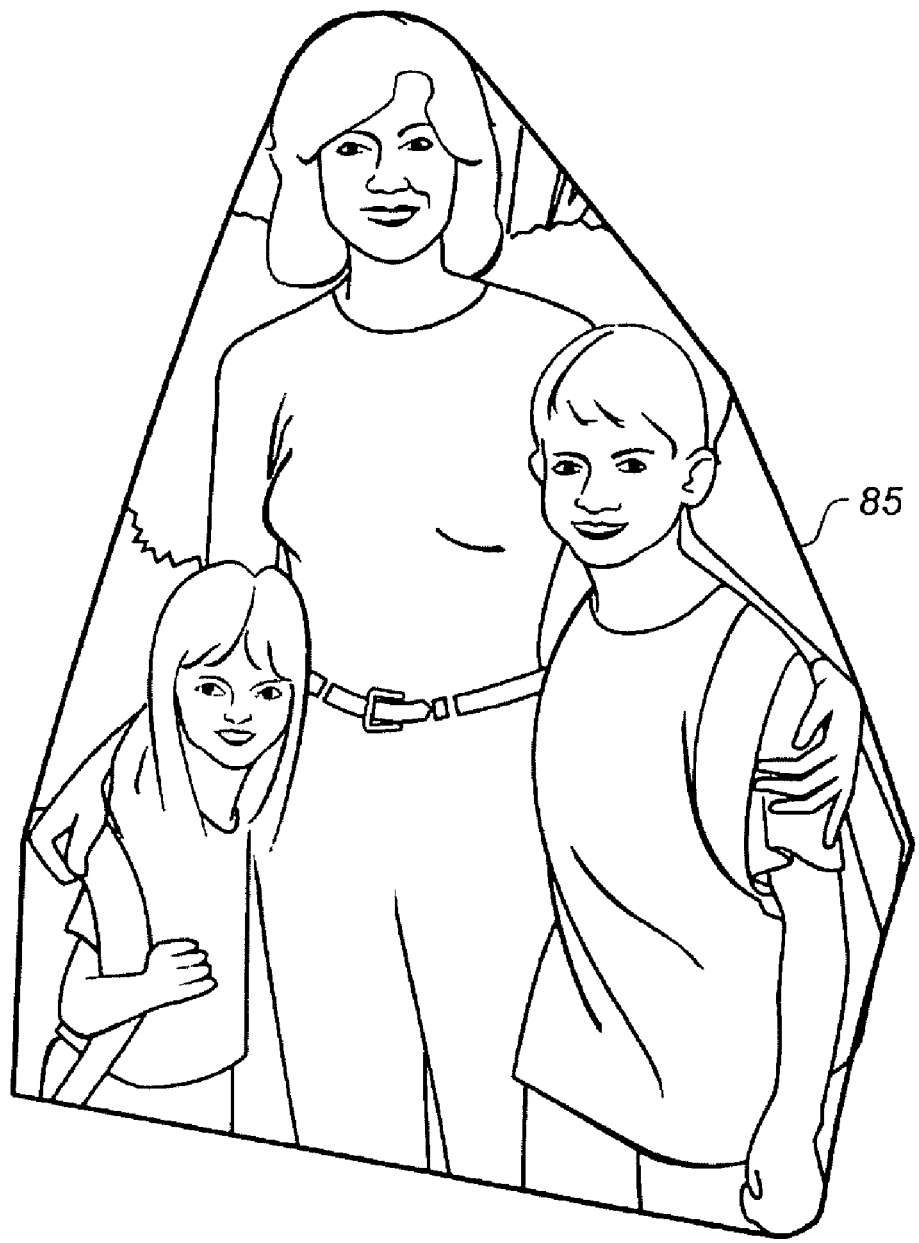
FIG. 15 is an example of the cutout image according to the present invention.

Referring to FIG. 1, there is shown a flow chart of an embodiment of the present invention. An original input digital image 10, an example shown in FIG. 9, is first processed by a main subject detection stage 20. The result is a main subject belief map 25, an example shown in FIG. 10, indicating the relative importance and location of the main subject in the image. Next, predetermined privileged objects, such as human faces, are located and a mask is produced 30 for each privileged object to include margins around its corresponding privileged object. The result is a mask 1800 shown in FIG. 18. The mask image and the main subject belief map is combined 40 into a combined belief map 45, as shown in FIG. 11, where all regions retain the belief values from the main subject belief map, except that the margin area around privileged objects 99 are re-assigned the highest belief values. In step 50, a convex hull 800, as shown in FIG. 8, is computed to include the mask(s) with margin(s) and regions of the highest belief values from the main subject belief map. To include regions that are likely to be affiliated with the main subjects, e.g., people's clothing and limbs, the convex hull is expanded 60 to include those medium belief values regions 1310, as shown in FIG. 13, that simultaneously intersect with the convex hull. The result is a general polygon (not necessarily convex any more). If desired, one can compute 70 an expanded second convex hull 1410, as shown in FIG. 14. Finally either the convex hull 800, or the union of the convex hull 800 and medium belief values region 1310, or expanded second convex hull 1410 is applied 80 to the original image to obtain an image cutout 85, as shown in FIG. 15, which can be used 90 in a target product such as a collage (from multiple source images) or a template (from a single source image).

This invention automatically produces a cutout from a digital image according to an analysis of the general and specific main subjects in the scene. A method for detecting main subjects (e.g., main subject detection or "MSD") in a consumer-type photographic image from the perspective of a third-party observer is described in U.S. Pat. No. 6,282,317, the disclosure of which is incorporated herein by reference. Main subject detection provides a measure of saliency or relative importance for different regions that are associated with different subjects in an image. Main subject detection enables a discriminative treatment of the scene content for a number of applications related to consumer photographic images, including automatic image cropping and image cutout.

The MSD system is built upon mostly low-level vision features with semantic information integrated whenever available. This MSD system has a number of steps, including region segmentation, feature extraction, and probabilistic semantic reasoning. In particular, a large number of features are extracted for each segmented region in the image to represent a wide variety of visual saliency properties, which are then input into a tunable, extensible probability network to generate a belief map containing a continuum of values.

Using MSD, regions that belong to the main subject are generally differentiated from the background clutter in the image. Thus, automatic image cutout becomes possible.

Automatic image cutout is a nontrivial operation that was considered impossible for unconstrained images, which do not necessarily contain uniform background, without a certain amount of scene understanding.

Figure 2:
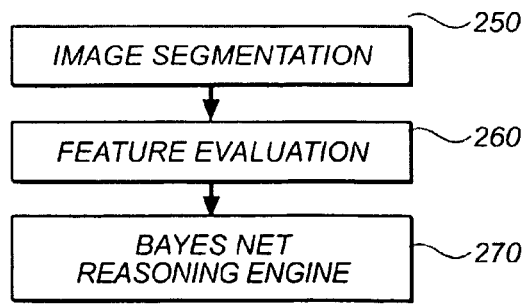
FIG. 2 is a flow chart of the main subject detection process shown in FIG. 1.

Referring to FIG. 2, an input image is segmented in an image segmentation stage 250 into a few regions of homogeneous properties, such as color and texture. The regions are evaluated in a feature evaluation stage 260 for their saliency in terms of two independent but complementary types of features; structural features and semantic features. For example, recognition of human skin or faces is semantic while determination of what stands out generically is categorized as structural. Respecting structural features, a set of low-level vision features and a set of geometric features are extracted. Respecting semantic features, key subject matters frequently seen in photographic pictures are detected. The evidences from both types of features are integrated using a Bayes net-based reasoning engine 270 to yield the final main subject belief map 25, as shown in FIG. 10. For reference on Bayes nets, see J. Pearl, *Probabilistic Reasoning in Intelligent Systems*, Morgan Kaufmann, San Francisco, Calif., 1988, the contents of which are hereby incorporated by reference thereto.

One structural feature is centrality. In terms of location, the main subject tends to be located near the center instead of the periphery of the image, therefore, a high degree of centrality is indicative that a region is a main subject of an image. However, centrality does not necessarily mean a region is directly in the center of the image. In fact, professional photographers tend to position the main subject along lines and intersections of lines that divide an image into thirds, the so-called gold-partition positions or rule of thirds.

It should be understood that the centroid of the region alone may not be sufficient to indicate the location of a region with respect to the entire image without any indication of its size and shape of the region. The centrality measure is defined by computing the integral of a probability density function (PDF) over the area of a given region. The PDF is derived from the "ground truth" data, in which the main subject regions are manually outlined and marked by a value of one and the background regions are marked by a value of zero, by summing the ground truth maps over an entire training set. In essence, the PDF represents the distribution of main subjects in terms of location. The centrality measure is devised such that every pixel of a given region, not just the centroid, contributes to the centrality measure of the region to a varying degree depending on its location. The centrality measure is defined as:

$$\text{centrality} = \frac{1}{N_R} \sum_{(x,y) \in R} PDF_{MSD\_Location}(x, y)$$

where (x,y) denotes a pixel in the region R, $N_R$ is the number of pixels in region R.

If the orientation is unknown, the PDF is symmetric about the center of the image in both vertical and horizontal directions, which results in an orientation-independent centrality measure. The shape of this PDF is such that objects located in the center of an image are more likely to be the main subject. If the orientation is known, the PDF is symmetric about the center of the image in the horizontal direction but not in the vertical direction, which results in an orientation-dependent centrality measure. The shape of this orientation-aware PDF is such that objects located in the bottom portion of an image are more likely to be the main subject.

Another structural feature is borderness. Many background regions tend to contact one or more of the image borders. Therefore, a region that has significant amount of its contour on the image borders is more likely to belong to the background then to the main subject. Two measures are used to characterize the borderness of a region. They include the number of image borders that a region intersects (hereinafter "borderness$_1$") and the percentage of a region's perimeter along the image borders (hereinafter "borderness$_2$").

When orientation is unknown, borderness$_1$ is used to place a given region into one of six categories. This is determined by the number and configuration of image borders that the region is in contact with. A region is in contact with a border when at least one pixel in the region falls within a fixed distance of the border of the image. Distance is expressed as a fraction of the shorter dimension of the image. The six categories for borderness$_1$ are: none, one border, two borders, two facing borders, three or four borders that the region contacts. The more contact that a region has with a border increases the likelihood that the region is not a main subject.

If the image orientation is known, the borderness feature can be redefined to account for the fact that a region that is in contact with the top border is much more likely to be background than a region that is in contact with the bottom border. This results in twelve categories for borderness$_1$ determined by the number and configuration of image borders that the region is in contact with. Using the definition of "in contact with" from above, the four borders of the image are labeled as "Top", "Bottom", "Left", and "Right" according to their position when the image is oriented with objects in the scene standing upright.

The second borderness features, borderness$_2$, is defined as the fraction of the region perimeter that is on the image border. This fraction, intrinsically, cannot exceed one-half, because to do so would show the region has a negative area, or a portion of the region exists outside the image area, which would be unknown for any arbitrary image. Since such a fraction cannot exceed one-half, the following definition is used to normalize the feature value to a range from zero to one.

$$\text{Borderness}_2 = 2 \times (\text{number\_of\_region\_perimeter\_on\_image\_border}) / (\text{number\_of\_region\_perimeter\_pixels})$$

One of the semantic features is human skin. According to a study of a photographic image database of over 2000 images, over 70% of the photographic images have people and about the same number of images have sizable faces in them. Thus, skin tones are common in images. Indeed, people are the single most privileged subject in photographs. Therefore, an algorithm that can effectively detect the presence of skin tones is useful in identifying the main subject of an image. Likewise, an algorithm that can effectively detect the presence of a human face is useful in identifying the main subject of an image.

In the present invention, the skin detection algorithm utilizes color image segmentation and a pre-determined skin distribution in a specific chrominance space, as: P(skin|chrominance). It is known by those skilled in the art that the largest variation between different races is along the luminance direction, and the impact of illumination sources is also primarily in the luminance direction. Thus, if a given region falls within the defined chrominance space, the probabilities are that it is skin, regardless of the level of luminance.

For reference see Lee, "Color image quantization based on physics and psychophysics," *Journal of Society of Photographic Science and Technology of Japan*, Vol. 59, No. 1, pp. 212-225, 1996, which is hereby incorporated by reference thereto. The skin region classification is based on maximum probability according to the average color of a segmented region, as to where it falls within the predefined chrominance space. However, the decision as to whether a region is skin or not is primarily a binary one. Utilizing a continuum of skin belief values contradicts, to some extent, the purpose of identifying skin and assigning a higher belief value. To counteract this issue, the skin probabilities are mapped to a belief output via a Sigmoid belief function, which serves as a "soft" thresholding operator. The Sigmoid belief function is understood by those skilled in the art.

Respecting the determination of whether a given region is a main subject or not, the task is to determine the likelihood of a given region in the image being the main subject based on the posterior probability of:

$P$(main subject detection|feature)

In an illustrative embodiment of the present invention, there is one Bayes net active for each region in the image. Therefore, the probabilistic reasoning is performed on a per region basis (instead of per image).

The output of main subject detection used by the present invention is a list of segmented regions ranked in descending order of the likelihood (or belief) that each is a main subject. This list can be readily converted into a belief map in which each region is located and is assigned a belief value proportional to the main subject belief of the region. Therefore, this map can be called a main subject belief map. An example is shown in FIG. 10, where the different grey values are proportional to the main subject belief of the region. Because of the continuum of belief values employed in the belief map, the belief map is more than a binary map that only indicates location of the determined main subject. The associated likelihood is also attached to each region so that the regions with large values correspond to regions with higher confidence, or belief, that it is part of the main subject.

To some extent, this belief map reflects the inherent uncertainty for humans to perform such a task as MSD because different observers may disagree on certain subject matter while agreeing on other subject matter in terms of main subjects. However, a binary decision, when desired, can be readily obtained by using an appropriate threshold on the belief map. Moreover, the belief information can be very useful for downstream applications. For example, different weighting factors can be assigned to different regions (subject matters) in determining the shape and location of the image cutout.

For determination of the shape and location of the cutout polygon, the present invention uses the main subject belief map instead of a binarized version of the map to avoid making a hard and sometimes bad cutout decision that is irreversible. Furthermore, using the continuous values of the main subject beliefs helps trade-off different regions under the constraints encountered in image cutout. A binary decision on what to include and what not to include, once made, leaves little room for trade-off. For example, if the main subject region is smaller than the cutout polygon, the only reasonable choice, given a binary main subject map, is to leave equal amounts of margin around the main subject region. On the other hand, secondary main subjects are indicated by lower belief values in the main subject belief map, and can be included in the image cutout according to a descending order of belief values once the main subject of highest belief values is included.

Moreover, if an undesirable binary decision on what to include/exclude is made, there is no recourse to correct the mistake. Consequently, the image cutout result becomes sensitive to the threshold used to obtain the binary decision. With a continuous-valued main subject belief map, every region or object is associated with a likelihood of being included or a belief value in its being included.

Figure 4:
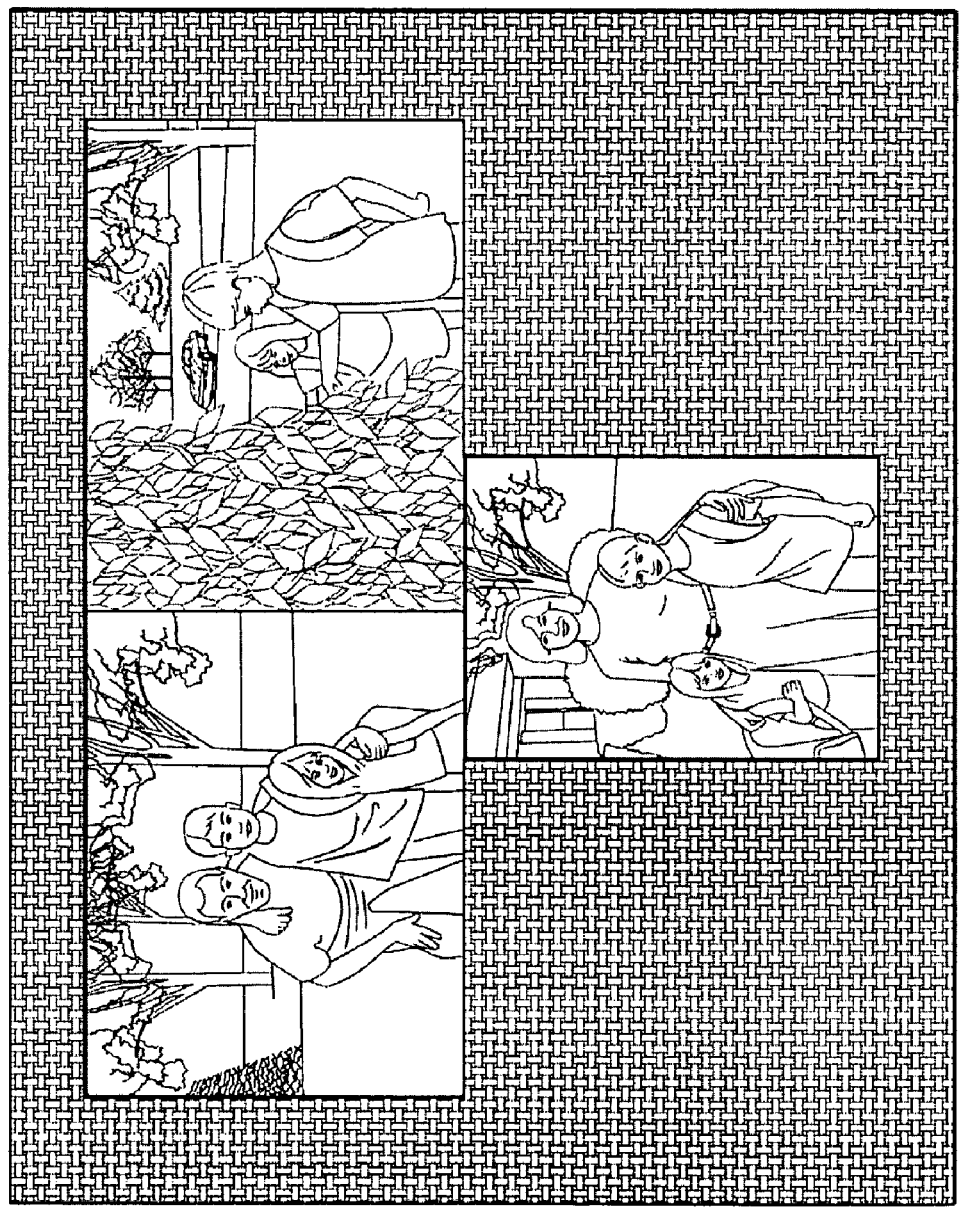
FIG. 4 is a pictorial view of a conventional "tiling" method for producing an image collage.
Figure 5:
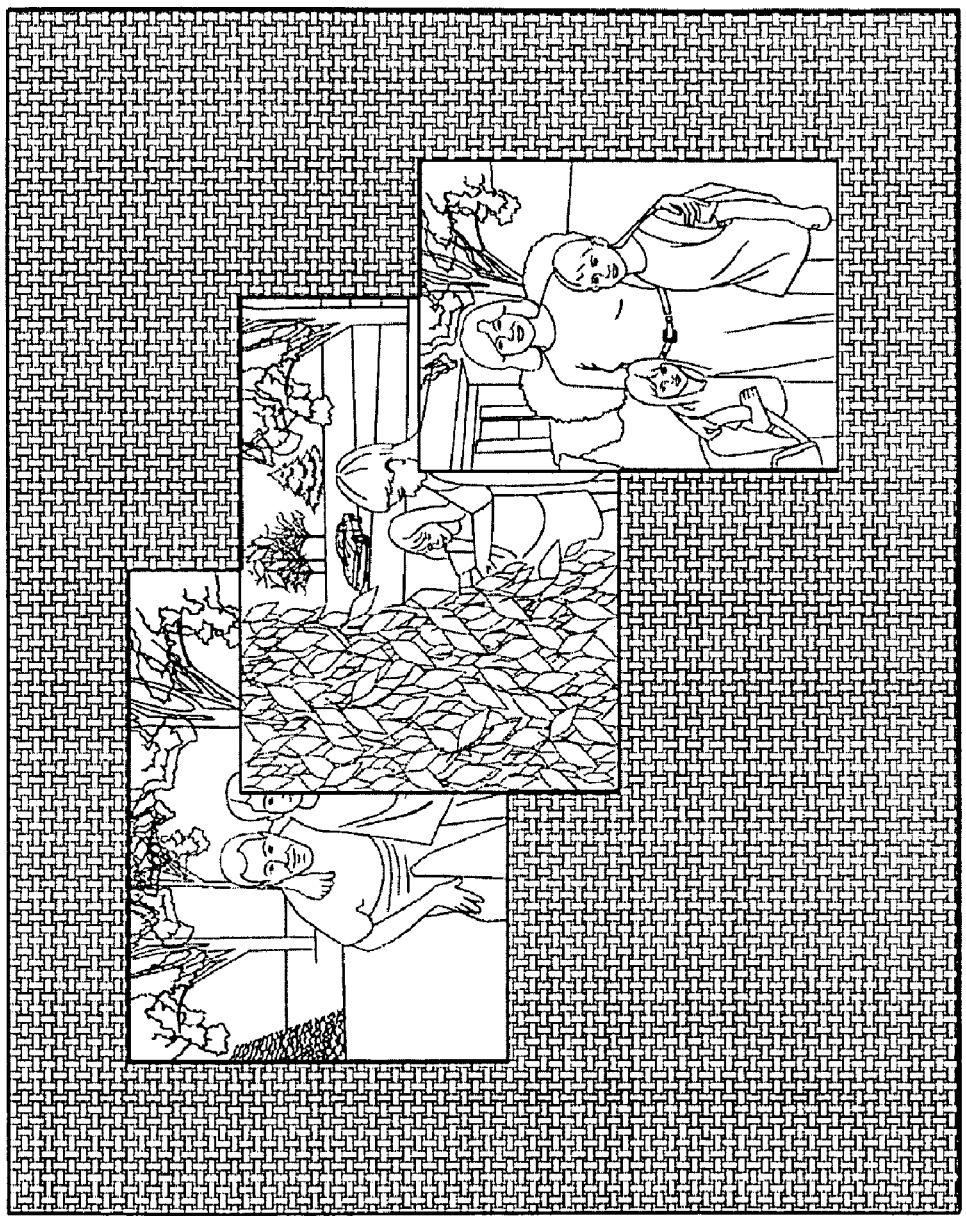
FIG. 5 is a pictorial view of a conventional "piling" method for producing an image collage.
Figure 6:
FIG. 6 is a pictorial view of a conventional "staggering" method for producing an image collage.
Figure 7:
FIG. 7 is a pictorial view of a conventional "blending" method for producing an image collage.

A few conventional image collage schemes are illustrated in FIGS. 4-6. Some of these scheme are not based on analysis of the content of a given image, for example "tiling" (see FIG. 4) and "piling" (see FIG. 5). Note tiling preserves all the image content but is not interesting, while "piling" can occlude main subjects of many images from the view and thus undesirable. With "staggering" by Wang et al., most of the main subjects are preserved even though image boundaries are present (see FIG. 6). Also, note that the method by Wang et al. deals with images with a single region of interest (ROI), clearly separated from the background. When such conditions are not met, a mask of the ROI, referred to as a saliency map in Wang et al., cannot be easily defined or obtained automatically. In Wang et al, the biggest salient region for each input image is extracted by adopting a visual attention model which combines multi-scale image features (color, texture, orientation) in a discriminative framework. Then the salient map is approximated by several concentric rectangles, with the innermost rectangle having the largest saliency density, and each rectangle having a homogeneous saliency density. In contrast, the main subject detection process in the present invention produces a continuous-valued belief map indicating the location and likelihood of the main subject(s), which need not to be a single object nor conform to the artificially designed concentric rectangular arrangement. Moreover, the present invention uses fairly tight convex hulls to cut out the main subject region or multiple main subject regions in order to create an image collage that does not contain the original boundaries of the source images.

Figure 3:
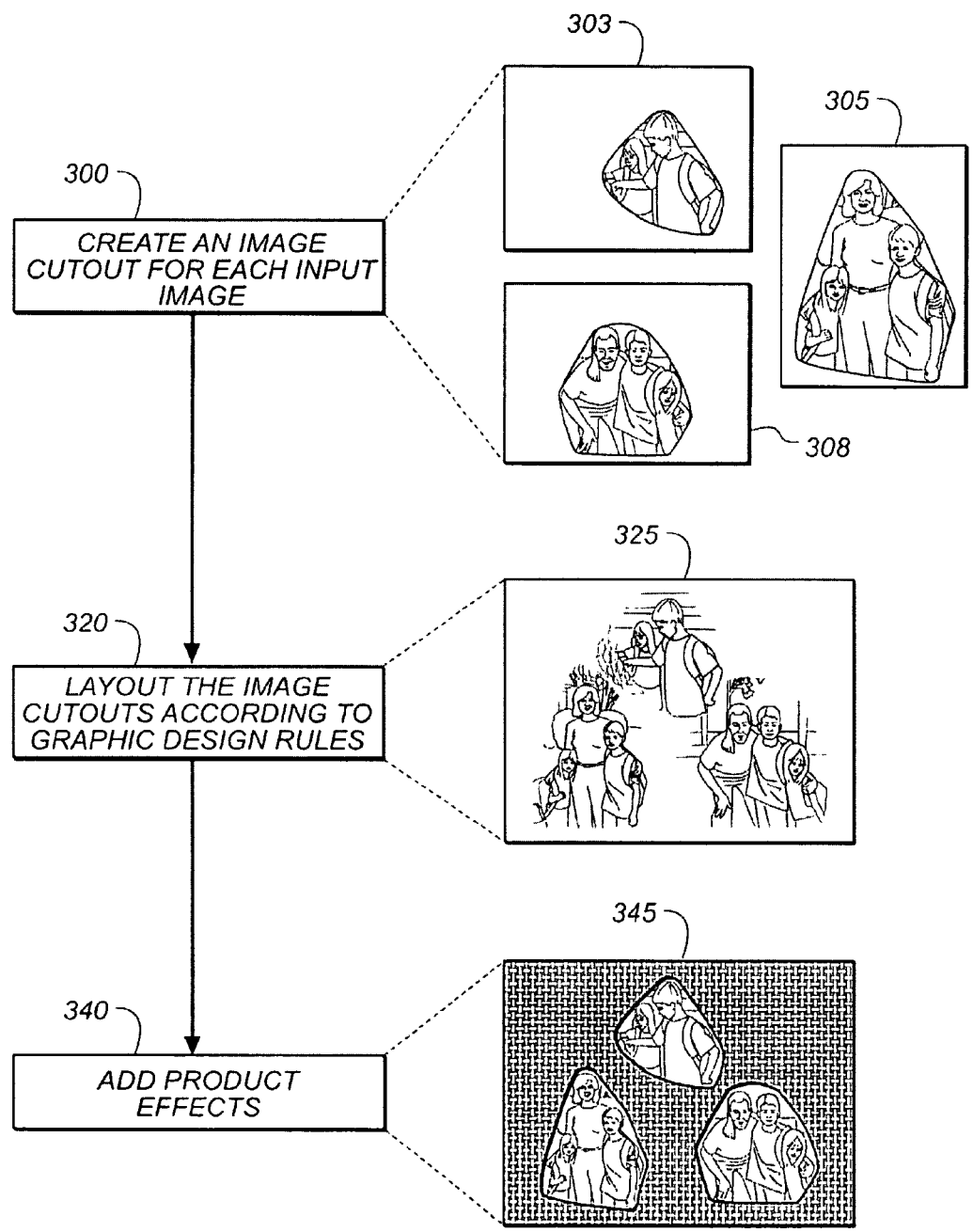
FIG. 3 is a flow chart of the steps of image collaging in the present invention.

Referring now to FIG. 3, the step 90 is expanded to show the method steps for producing an image collage from image cutouts according to the invention. After the main subject belief map 25 is created 300 for each of the images used for the collage, an image cutout 303, 305, 308 containing the main subject is produced for each input image. The cutout images are laid out 320 based on graphic design rules for the product, such as non-overlapping of convex hulls around the center of the product page 325. Finally, desired product effect can be added 340 to produce the final image collage 345. For example, the image cutout or cutouts can be laid out on a plain or textured background, or even a background image.

It should be noted that the method according to the present invention specifies higher numerical belief values corresponding to higher main subject probability. Recall that the primary subjects are indicated by the highest belief values and the secondary subjects are indicated by belief values lower than those of the primary subjects but higher than those of the background subjects. The goal is to find a reasonably tight polygon that contains the primary subjects completely while ensuring that the polygon has the high sum of belief values by including the secondary subjects if they are spatially attached to the primary subjects.

Referring to FIG. 8, the set of belief regions to be included in the main subject are enclosed in a so-called convex hull 800. In two dimensions a convex hull reduces to a convex polygon. A convex polygon is defined as polygon formed around a set of points such that given any two points on its boundary or its interior; all points on the line segment drawn between them are contained in the polygon's boundary or interior. An analogy is if all the points were pins then putting a rubber band around the pins forms a convex polygon.

The convex hull of the set of main subject belief regions is the smallest convex polygon for which all highest-valued belief regions are inside the boundary of the polygon. There are many well-known algorithms for computing a convex hull. Two are Graham's Scan and Jarvis's March. Either of these algorithms will provide a set of vertices for the convex hull containing the main subject belief regions. For further detail on convex hull see T. Corman, et al, *Introduction to Algorithms—$2^{nd}$ ed*, MIT Press, Cambridge Mass., pages 947-957, the contents of which are hereby incorporated by reference thereto.

In a preferred embodiment of the present invention, a "k-means" clustering process is utilized to compute proper thresholds of MSD beliefs in order to determine what constitutes the primary and secondary subjects. In one preferred embodiment, it is sufficient to use three levels to quantize MSD beliefs, namely "high", "medium", and "low." As would be known by one ordinarily skilled in the art, the present invention is not limited to simply three levels of classification, but instead can utilize a reasonable number of classification levels to reduce the (unnecessary) variation in the belief map. These three levels permit the main subject (high), the background (low), and an intermediate level (medium) to capture secondary subjects. Therefore, the invention can perform a k-means clustering with k=3 on the MSD belief map to "quantize" the belief values in an image-dependent fashion. Consequently, the belief for each region is replaced by the mean belief of the cluster in that region.

There are two major advantages in performing such clustering or quantization. First, clustering helps background separation by grouping low-belief background regions together to form a uniformly low-belief (e.g., zero belief) background region. Second, clustering helps remove noise in belief ordering by grouping similar belief levels together.

The k-means clustering effectively performs a multi-level thresholding operation upon the belief map. After clustering, two thresholds can be determined as follows:

$$\text{threshold}_{low}=(C_{low}+C_{medium})/2, \text{threshold}_{high}=(C_{medium}+C_{high})/2$$

where $\{C_{low}, C_{medium}, C_{high}\}$ is the set of centroids (average belief values) for the three clusters, and $\text{threshold}_{low}$ and $\text{threshold}_{high}$ are the low and high thresholds, respectively.

Regions with belief values below the lower threshold are considered "background" and their belief values are set to zero. Regions with belief values above the higher threshold are considered part of the main subject and need to be included in their entirety, whenever possible. Regions with intermediate belief values (e.g., less than or equal to the higher threshold and greater than or equal to the lower threshold) are considered part of the "secondary subject" and will be included as a whole or partially, if possible, to maximize the sum of main subject belief values retained by the cutout polygon. Note that the variance statistics of the three clusters can be used to set the thresholds more accurately to reflect cluster dispersions.

According to the present invention, the k-means process is initialized by finding the maximum value $\text{bel}_{maximum}$ and minimum values $\text{bel}_{minimum}$ of the belief map, computing the average value $\text{bel}_{average}$ of the maximum and minimum values for item in the belief map, and setting the initial centroids (denoted by a superscript of 0) at these three values, i.e., $$C_{low}^{0}=\text{bel}_{minimum}, C_{medium}^{0}=\text{bel}_{medium},$$
$$C_{high}^{0}=\text{bel}_{maximum}$$

Other forms of initialization may apply. For more about the k-means process, see Sonka, Hlavac, and Boyle, Image Processing Analysis, and MachineVision, PWS Publishing, 1999, pages 307-308. For typical MSD belief maps, the k-means process usually converges in fewer than 10 iterations.

To obtain visually pleasing image cutout, a number of important image composition rules need to be enforced. In a preferred embodiment of the present invention, one of the image composition rules is to maintain the so-called "headroom" such that not only should the top of the main subject (e.g., a person's head) be included but a pre-determined amount of space, e.g., 10% of the size of the main subject, needs to be maintained between the cutout boundary and the head of the main subject. An illustration of the headroom 99 is shown in FIG. 11. In this case, the head of a subject is considered a privileged object that receives privileged treatment. Those who are skilled in the art can define and enforce other privileged objects or other image composition rules.

Figure 12:
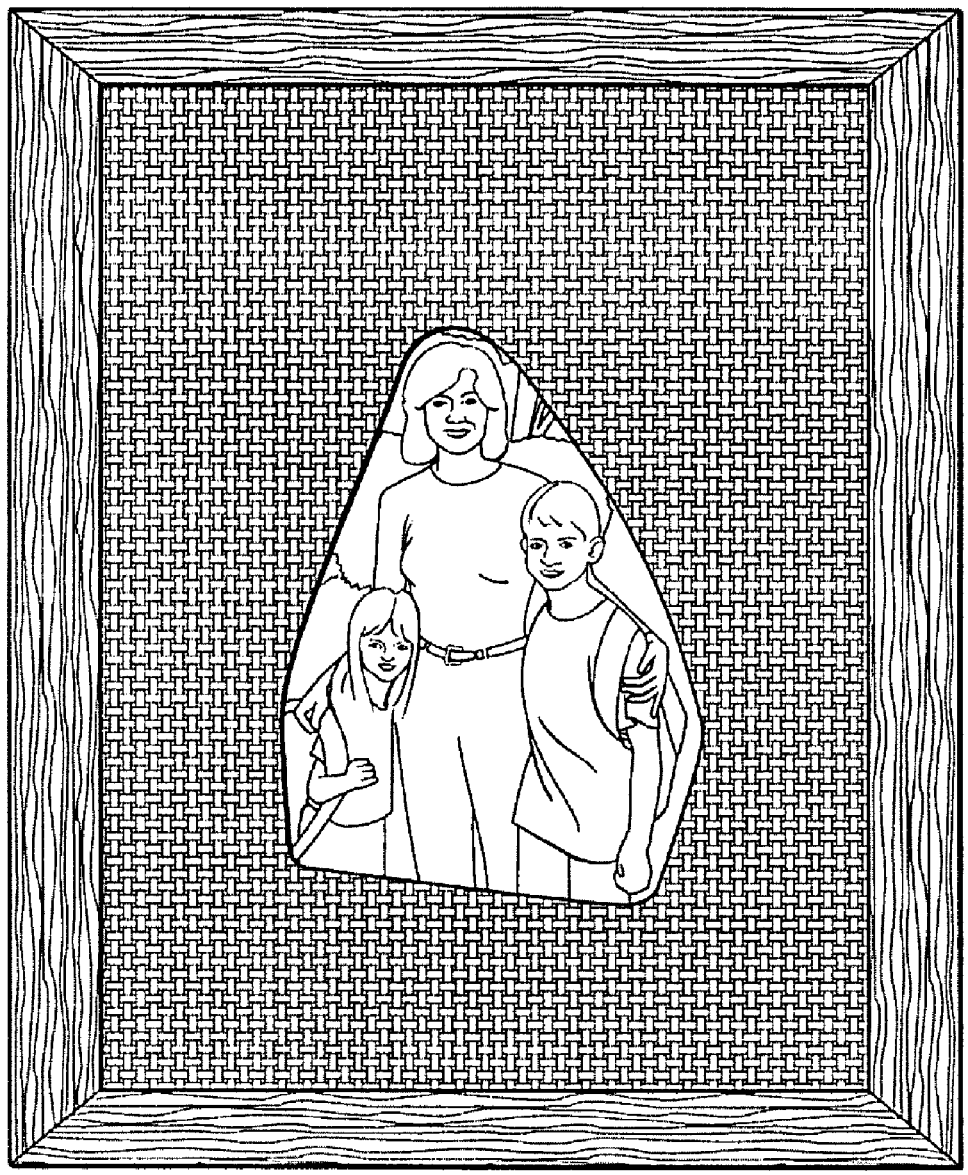
FIG. 12 is an example of a product using the convex hull to create a border around the cutout image.

Referring back to FIG. 3, the convex hull now specifies the cutout of the main subject of the image. The cutout can now be scaled and placed onto an appropriate background for the desired product following graphic art composition rules. Graphic design rules may specify edge treatments that follow the boundary of the cutout. Edge treatments such as simulated or physical matting of the image, as shown in FIG. 12, applying border with out without a drop shadow, or blending of the cutout boundary with the background are typical options.

For collages that use more than one image or contain other graphical elements, the cutout can be used to determine the image placement such that the main subject of each image or graphical element is not occluded. One method would overlay (stagger) each full image and graphics to minimize the occlusion of the main subjects.

A second method would produce collages by placing the cutouts of the each element onto the collage in non-overlapping positions. Edge treatments such as simulated or physical matting of the image, applying a border with out without a drop shadow, or blending of the cutout boundary with the background or adjacent images may be applied.

The placement of multiple image cutouts can be guided by the respective main subject belief maps. Because the present invention determines primary and secondary subjects, a collage can be created in partially overlapping manner. In particular, the secondary subjects (non-privilege by definition) can be occluded if necessary due to space or user preference.

Figure 18:
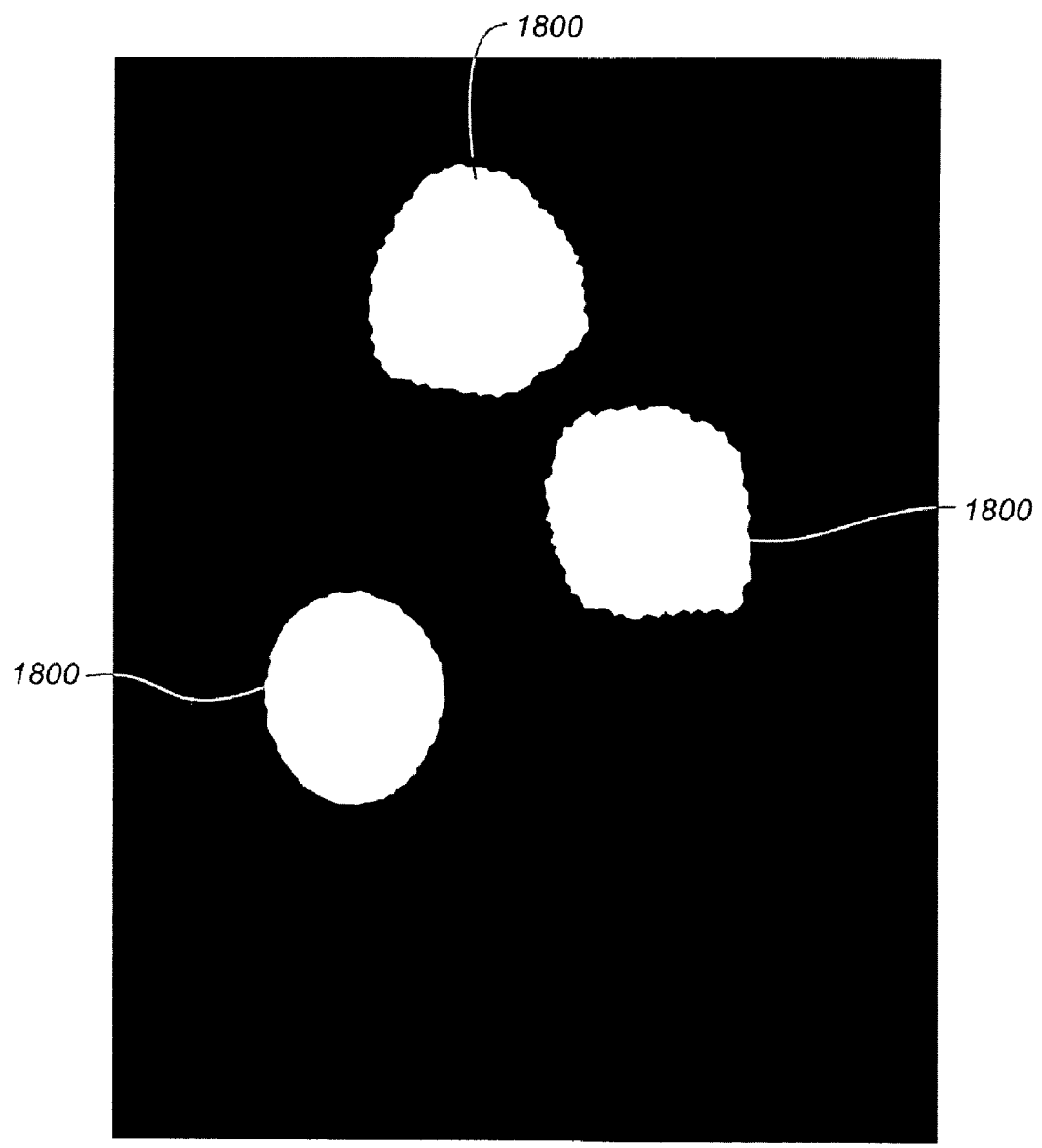
FIG. 18 is an illustrative example of masks for privileged objects, faces in this case, including margins around the privileged objects.

An example of a consumer photograph and various intermediate results leading to the image cutout are shown in FIGS. 9-15. More specifically, FIG. 9 shows an original photographic image 10, FIG. 10 illustrates the corresponding main subject belief map 25 with brighter regions indicating main subjects of higher belief values: the faces and arms are the main subject, people's body and clothing are the secondary main subject, the trees and grass lawn are background. FIG. 18 is an example of masks of the privileged objects made from the image of FIG. 9 according to the present invention, showing a desired amount of headroom. FIG. 11 shows the combined belief map 45 and the masks for the privileged objects 99. FIG. 8 is an example of the first convex hull 800 made from the image of FIG. 11 according to present invention. FIG. 13 is an example of the added regions 1310 creating the expanded polygon according to the present invention. FIG. 14 is an example of the expanded second convex hull 1410 according to the present invention. Finally, FIG. 15 is an example of the cutout image 85 according to the present invention.

The present invention is typically implemented in a computer system for implementing the present invention in a digital printing environment, such as would be provided by an interactive stand-alone digital photofinishing system, such as a kiosk, or an on-line print fulfilling system. The present invention is not limited to the computer system, but may be used on any electronic processing system such as found in home computers, kiosks, retail or wholesale photofinishing, or any other system for the processing of digital images.

Figure 16:
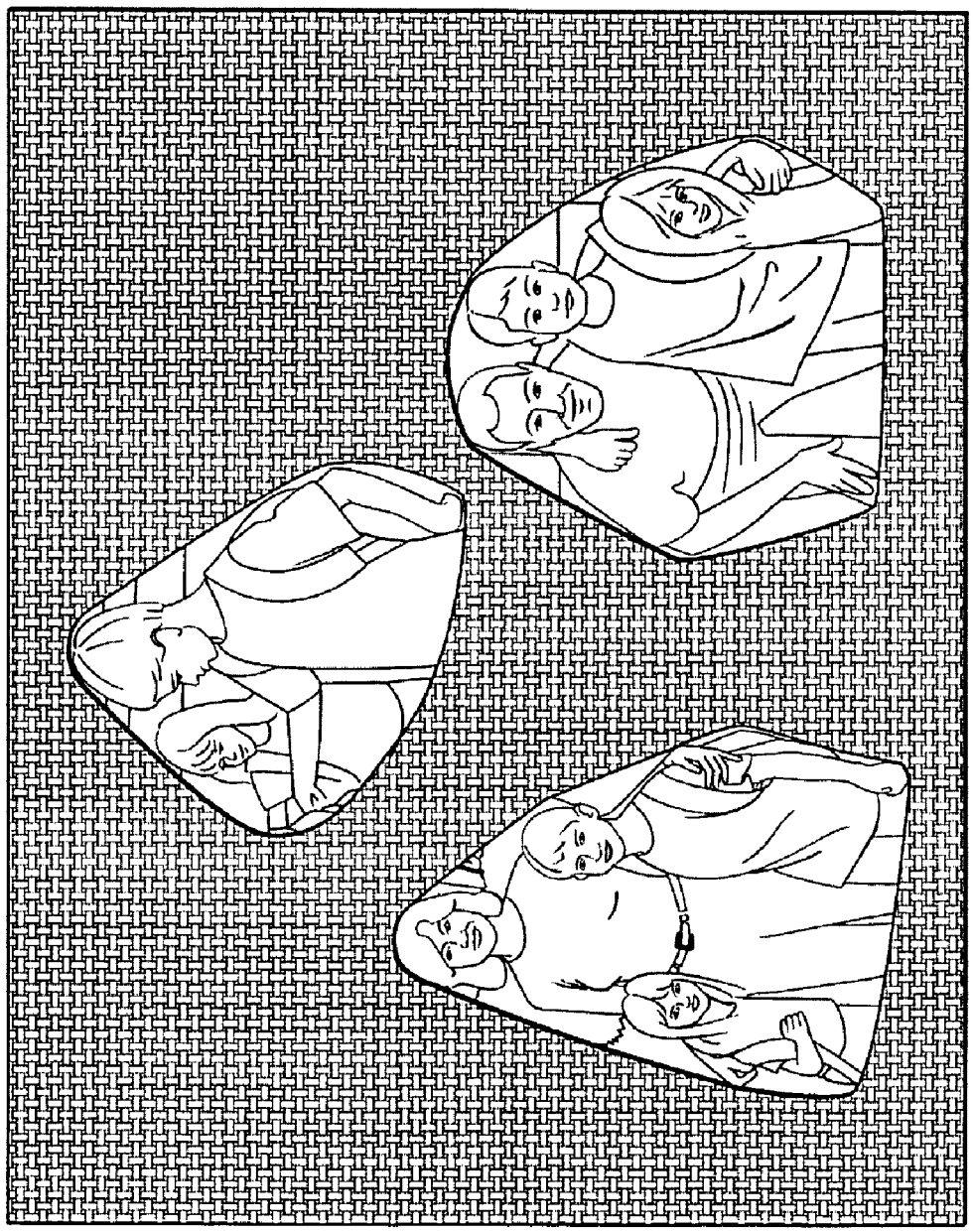
FIGS. 16 and 17 are examples of photo collages according to the present invention.
Figure 17:
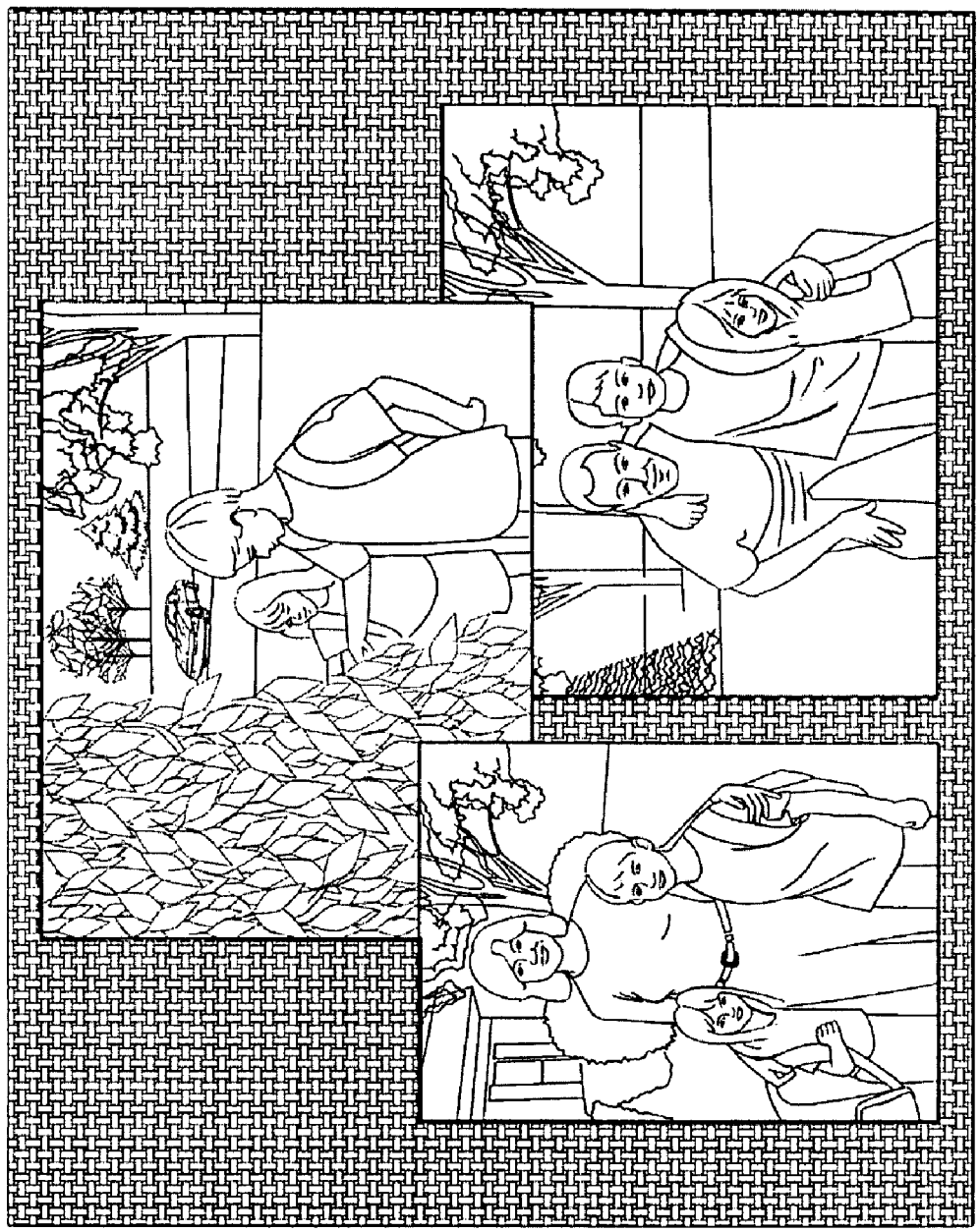

FIGS. 16 and 17 contain examples of the photo collages according to the present invention.

The invention has been described with reference to a preferred embodiment. However, it will be appreciated that variations and modifications can be effected by a person of ordinary skill in the art without departing from the scope of the invention.

PARTS LIST 10 original input digital image
20 main subject detection stage
25 main subject belief map
30 locate privileged objects and produce mask(s)
40 mask image and the main subject belief map is combined
45 combined belief map
50 compute convex hull including mask(s) with margin(s) and highest belief regions
60 expand convex hull to include intersecting medium belief regions
70 compute expanded second convex hull
80 apply convex hull to original image to produce image cutout
85 image cutout
90 use image cutout in target product collage or template
99 headroom
250 image segmentation stage
260 feature evaluation
270 Bayes net reasoning engine
300 create an image cutout for each input image
303 image cutout
305 image cutout
308 image cutout
320 layout the image cutouts according to graphic design rules
325 layout
340 add product effects
345 final product with background applied
800 convex hull
1310 added medium-belief regions
1410 second (expanded) convex hull
1800 masks for privileged objects

The invention claimed is:

1. A method for automatically producing a new digital image from digital images that includes regions of interest, comprising:
   (a) using a processor to obtain a main subject belief map including an array of belief values that indicate the location and relative importance of subject matter in each of at least two digital images;
   (b) using one or more thresholds along with the belief maps to locate one or more privileged objects in each digital image;
   (c) producing a mask for each privileged object, each such mask including margins around its corresponding privileged object;
   (d) producing a convex hull for each mask that includes the mask with margin(s) and regions of highest belief values from the associated belief map; and
   (e) producing the new digital image including portions of each digital image based upon each associated convex hull.

2. The method of claim 1 wherein step (b) is performed before step (a).

3. The method of claim 1 further including expanding the first convex hull to include regions of medium belief values intersecting with the first convex hull.

4. The method of claim 3 further including producing a second convex hull that includes the first convex hull and the regions of medium belief values intersecting with the first convex hull.

5. The method of claim 1 further including using the first convex hull on the first digital image to produce a first cutout and using such first cutout to produce the second digital image.

6. The method of claim 5 further including repeating steps a-d on a another digital image to produce a second cutout and using the first and second cutouts to produce the second digital image as a collage.

7. The method of claim 3 further including using the expanded first convex hull on the first digital image to produce a first cutout and using such first cutout to produce the second digital image.

8. The method of claim 7 further including repeating the method of claim 3 on another digital image to produce a second cutout and using the first and second cutouts to produce the second digital image as a collage.

9. The method of claim 6 further including using the second convex hull on the first digital image to produce a first cutout and using such first cutout to produce the second digital image.

10. The method of claim 9 further including repeating the method of claim 4 on another digital image to produce a second cutout and using the first and second cutouts to produce the second digital image as a collage.

11. The method of claim 5 wherein the producing of the second digital image includes scaling of the cutout image, and combining with a background image using one of the following edge treatments for the cutout:
   (I) using a hard edge with a simulated mat to appear as a matted image for framing,
   (II) using a hard edge with a white border to simulate a photograph, or
   (III) blending the edge into the background.

12. The method of claim 8 wherein second digital image is produced without overlapping the cutout images and including scaling of the cutout images, with a background image using one of the following edge treatments for the cutout:
   (I) using a hard edge with a simulated mat to appear as a matted image for framing,
   (II) using a hard edge with a white border and drop shadow to simulate a photograph, or
   (III) blending the edge into the background.

13. The method of claim 10 wherein second digital image is produced, without overlapping the cutout images and including scaling of the cutout images, with a background image using one of the following edge treatments for the cutout:
   (I) using a hard edge with a simulated mat to appear as a matted image for framing,
   (II) using a hard edge with a white border and drop shadow to simulate a photograph, or
   (III) blending the edge into the background.

14. The method of claim 8 wherein further comprising:
(f) using the main subject belief map to determine least important area outside the convex hulls in first digital image and the another digital image; and
(g) overlaying the image cutouts at the determined areas.

15. The method of claim 10 wherein, further comprising:
(f) using the main subject belief map to determine least important area outside the convex hulls in first digital image and the another digital image; and
(g) overlaying the image cutouts at the determined areas.

16. The method of claim 8 wherein the second digital image is produced with partial overlapping among the image cutouts, further comprising:
(f) using the main subject belief map to determine less important area along the border of the convex hull of each image cutout; and
(g) overlapping the image cutouts at the determined areas.

17. The method of claim 10 wherein the second digital image is produced, with partial overlapping among the image cutouts, further comprising:
(f) using the main subject belief map to determine less important area along the border of the convex hull of each image cutout; and
(g) overlapping the image cutouts at the determined areas.

18. The method of claim 16 wherein the second digital is produced where non-privileged image areas can be overlapped with other images, using one of the following edge treatments for the cutout:
(h) using intelligent overlap with edge treatment, or
(i) blending the edge of each cutout image into the background or into the other cutout images they overlap.

* * * * *